United States Patent
Vedder et al.

(10) Patent No.: US 8,146,996 B2
(45) Date of Patent: Apr. 3, 2012

(54) INCLINATION ADJUSTER IN PARTICULAR FOR THE BACKREST OF A VEHICLE BACK SEAT

(75) Inventors: Andreas Vedder, Haan (DE); Holger Finner, Huckeswagen (DE)

(73) Assignee: Johnson Controls Technology Company, Holland, MI (US)

( * ) Notice: Subject to any disclaimer, the term of this patent is extended or adjusted under 35 U.S.C. 154(b) by 90 days.

(21) Appl. No.: 12/594,316

(22) PCT Filed: Apr. 4, 2008

(86) PCT No.: PCT/EP2008/002709
§ 371 (c)(1),
(2), (4) Date: Jan. 20, 2010

(87) PCT Pub. No.: WO2008/122418
PCT Pub. Date: Oct. 16, 2008

(65) Prior Publication Data
US 2010/0109409 A1 May 6, 2010

(30) Foreign Application Priority Data

Apr. 5, 2007 (DE) .......................... 10 2007 016 935
Aug. 28, 2007 (DE) .......................... 10 2007 040 806
Nov. 21, 2007 (DE) .......................... 10 2007 056 156

(51) Int. Cl.
*B60N 2/20* (2006.01)

(52) U.S. Cl. ................................................ 297/378.13
(58) Field of Classification Search ............. 297/378.13
See application file for complete search history.

(56) References Cited

U.S. PATENT DOCUMENTS

| 4,099,425 | A | 7/1978 | Moore |
| 6,312,055 | B1 * | 11/2001 | Uematsu .................. 297/378.13 |
| 6,769,741 | B2 * | 8/2004 | Denning .................. 297/378.13 |
| 7,377,584 | B2 * | 5/2008 | Griswold et al. ..... 297/378.13 X |
| 7,484,807 | B2 * | 2/2009 | Okazaki et al. .......... 297/378.13 |
| 7,641,282 | B2 * | 1/2010 | Hinata et al. ........ 297/378.13 X |
| 7,819,478 | B2 * | 10/2010 | Griswold et al. ........ 297/378.13 |
| 2005/0062327 | A1 | 3/2005 | Griswold et al. |
| 2008/0129017 | A1 * | 6/2008 | Okazaki et al. ................ 280/727 |

FOREIGN PATENT DOCUMENTS

| FR | 2710883 A1 | 4/1995 |
| FR | 2780353 A1 | 12/1999 |
| FR | 2789636 A1 | 8/2000 |
| JP | 2003054299 A | 2/2003 |
| JP | 2003312329 A | 11/2003 |
| JP | 2004321314 A | 11/2004 |
| JP | 2004322743 A | 11/2004 |

* cited by examiner

*Primary Examiner* — Rodney B White
(74) *Attorney, Agent, or Firm* — Fletcher Yoder P.C.

(57) ABSTRACT

An inclination adjuster is provided for a vehicle seat. The adjuster includes a rail and a slide piece displaceable on the rail. The rail is curved and has a one piece flat profile. Latching means interacts with complementary latching means for engaging the rail. One or both latching means may include a claw or claws.

13 Claims, 6 Drawing Sheets

INCLINATION ADJUSTER IN PARTICULAR FOR THE BACKREST OF A VEHICLE BACK SEAT

CROSS REFERENCE TO RELATED APPLICATIONS

This application claims priority from and the benefit of PCT Application No. PCT/EP2008/002709, filed on Apr. 4, 2008; German Patent No. DE 10 2007 016 935.5, filed on Apr. 5, 2007; German Patent No. DE 10 2007 040 806.6, filed on Aug. 28, 2007; and German Patent DE 10 2007 056 156.5, filed on Nov. 21, 2007; all entitled "Inclination Adjuster in Particular for the Backrest of a Vehicle Back Seat", which are herein incorporated by reference.

BACKGROUND

The invention is based on an inclination adjuster for a vehicle seat. In this case, the inclination adjuster comprises a slide piece and a rail, the slide piece being displaced on the rail for the inclination adjustment. The rail is provided as a curved rail.

Such inclination adjusters are generally known. The publication FR 2 710 883 A1 discloses, for example, an inclination adjuster for a vehicle seat, a slide piece being displaced on a rail. The publication JP 2003-54299 A, the publication JP 2003-312329 A, the publication JP 2004-321314 and the publication JP 2004-322743 A also disclose inclination adjusters comprising a slide piece and rail. A drawback with the inclination adjusters according to the prior art is the complicated construction of the rail, which is generally manufactured as an L-shaped or U-shaped curved component and/or as a multi-part component.

It was, therefore, the object of the present invention to provide an inclination adjuster which has a construction with fewer and more lightweight components than in the prior art and yet allows a reliable inclination adjustment.

SUMMARY

The object is achieved by an inclination adjuster for a vehicle seat, the inclination adjuster comprising a slide piece and a rail. The slide piece is in this case displaceable on the rail for the inclination adjustment and the rail is provided as a curved rail. Additionally, the rail is configured in one piece and as a flat profile.

A rail configured in one piece is, for example, formed by shaping a piece of material. For example, the rail may be manufactured from a single metal strip. By a "flat profile" is intended to be understood a component, the surface of the main direction of extension thereof being substantially greater than the thickness perpendicular to the surface of the main direction of extension.

As the rail is configured in one piece and as a flat profile, said rail is able to be produced in a substantially less complicated manner and able to be fitted into the inclination adjuster in a shorter time. Additionally, the rail becomes particularly robust by means of the one-piece construction, as none of the components of the rail, which are formed on the rail or fastened to the rail, are able to be broken off said rail. Moreover, a rail configured as a flat profile requires less constructional space in the vehicle and generally has only a relatively low weight.

According to the invention, it is provided that the rail is curved, preferably arcuate, without at the same time losing any of its extension in substantially two dimensions. Preferably, positive and/or non-positive connecting means are located on the outside of the curvature of the rail.

Preferably, the inclination adjuster comprising the rail and slide piece is used for the inclination adjustment of a backrest of a vehicle back seat. Particularly preferably, therefore, in particular in the longitudinal direction of a vehicle, the rail is attached to the bodywork thereof, for example in the region of the wheel housing for a rear tire. The slide piece is preferably fastened to the backrest.

During an inclination adjustment, the slide piece preferably slides along the rail, for example a backrest being inclined relative to a seat part of the vehicle seat. In order to fix the backrest in an inclined position, the slide piece and rail preferably cooperate positively and/or non-positively.

Alternatively, the slide piece is arranged on the bodywork and the rail is attached to the backrest of a vehicle seat, in particular in the longitudinal direction of a vehicle.

During an inclination adjustment, the rail preferably slides along the slide piece, a backrest being inclined, for example, relative to a seat part of the vehicle seat. In order to fix the backrest in an inclined position, preferably the slide piece and the rail cooperate positively and/or non-positively.

Preferably, the rail comprises a plurality of latching means for the positive and/or non-positive cooperation with the slide piece.

Preferably, the rail comprises the latching means only in partial regions, the rail preferably comprising three non-overlapping partial regions. Preferably, two of said three partial regions are provided in the edge region of the rail and one partial region in the center of the rail. The slide piece may, therefore, preferably only cooperate positively and/or non-positively with the rail in these partial regions. For example, the rail may have on three partial regions three respective teeth and four recesses, a toothed portion being formed by means of the teeth and the recesses as latching means. With a rail thus constructed, for example, a backrest may be adjusted in three positions between the front windshield and the rear windshield of the vehicle. Naturally, more or fewer than three inclined positions and thus more or fewer than three partial regions may also be provided for the latching means on the rail.

In a further preferred embodiment, the latching means are formed over the entire longitudinal face of the rail. The slide piece may, as a result, cooperate therewith positively and/or non-positively over the entire length of the rail. By means of this embodiment, a backrest, for example, may adopt a plurality of inclined positions relative to the seat part.

Preferably, the slide piece has a claw, the claw comprising a plurality of complementary latching means. Using the complementary latching means, the claw preferably engages in the rail, so that the claw and the rail cooperate positively and/or non-positively. Particularly preferably, the claw engages with the complementary latching means in the latching means of the rail. By means of the plurality of complementary latching means which engage in the rail, and the positive and/or non-positive connection between the latching means and the complementary latching means, the connection between the slide piece and the rail and/or the claw and the rail is particularly robust and stable. Advantageously, the claw is also not released inadvertently from the rail in the event of an accident.

Preferably, the claw is rotatably arranged on the slide piece by means of an articulation. The claw is thus preferably provided to be rotatable toward the rail and away from the rail. For an inclination adjustment, the claw is preferably rotated away from the rail, so that the complementary latching means of the claw do not engage in the rail. If no inclination adjustment is to be undertaken, the claw is preferably rotated toward the rail, so that the complementary latching means cooperate positively and/or non-positively with the rail and/or with the latching means.

Preferably, the slide piece has a spring means, the spring means pretensioning the claw toward the rail. The claw may, as a result, only be rotated away from the rail against the force of the spring means. The positive and/or non-positive connection between the claw and the rail may thus be secured advantageously. As by means of the non-positive and/or positive connection the slide piece is hindered from moving along the rail, the safety of the vehicle seat may be increased, for example, even in the event of an accident, against inadvertent adjustment of the backrest.

Preferably, the claw rotates away from the rail about the articulation when a handle is actuated. Preferably, the claw is pivoted to such an extent until the complementary latching means of the claw no longer engage in the rail and/or in the latching means of the rail. Moreover, in a preferred embodiment it may be provided to fix the position of the claw which has been thus pivoted. In order to release the fixing, preferably the handle has to be actuated again. In a further preferred embodiment, the handle only has to be actuated for rotating the claw away from the rail. Once the actuation of the handle is terminated, the claw is preferably rotated by the restoring force of the spring means again toward the rail and into engagement with the rail.

Preferably, the complementary latching means of the claw and/or the latching means of the rail are configured as toothed portions. Advantageously, therefore, the latching means and/or the complementary latching means may be formed by a stamping step, for example, in an uncomplicated manner.

Further preferably, at least one tooth of the toothed portion of the complementary latching means is of wedge-shaped configuration. Particularly preferably, the complementary latching means are formed respectively by four teeth, preferably one of the central teeth being of wedge-shaped configuration. As a result of the wedge shape of a tooth, the claw is clamped to the rail as soon as the claw is in engagement with the rail. A small movement of the claw within the toothed portion of the rail may thus be prevented, so that rattling noises produced thereby do not occur. Naturally, two, three or all teeth may also be of wedge-shaped configuration.

Further preferably, the teeth of the claw are dimensioned such that with a positive and/or non-positive connection to the rail the teeth protrude beyond said rail. Preferably, the rail is thus located in the center of the vertical extension of the teeth. Preferably, the teeth are supported by the regions on the claw protruding beyond the rail. The teeth of the claw may, as a result, advantageously absorb more load without being damaged thereby.

Preferably, the rail is provided in a fixed manner, for example on the bodywork of a motor vehicle, and the slide piece is arranged on the backrest or vice versa.

A further subject of the present invention is the backrest of a vehicle back seat comprising an inclination adjuster according to the invention.

Preferably, the rail may be connected to the backrest in a reversible manner. This preferred embodiment of the backrest according to the invention is, in particular, advantageous if the slide piece is fixed and the rail moves together with the backrest.

A further subject of the present invention is a method for the inclination adjustment of the backrest of a vehicle seat. In this connection, during the inclination adjustment, a flat profile is enclosed by a slide piece. The flat profile forms a preferably fixed rail on which the slide piece is displaced for the inclination adjustment. Alternatively, the flat profile is displaced relative to the fixed slide piece for the inclination adjustment of the backrest of the vehicle seat.

Preferably, the slide piece is fixed relative to the rail for a sufficient length of time for the latching means of the rail to cooperate positively and/or non-positively with the complementary latching means of the slide piece. The complementary latching means are thus preferably fastened to a claw of the slide piece.

The connection between the claw and the rail is preferably released by the actuation of a handle, when the claw is rotated away from the rail counter to the force of a spring means, about an articulation. Preferably, the slide piece may be displaced on the rail or the rail displaced along the claw, when the claw and the rail and/or the complementary latching means and the latching means no longer cooperate positively and/or non-positively. By the displacement of the slide piece on the rail or of the rail relative to the slide piece, preferably a backrest of a vehicle back seat is adjusted in inclination.

DRAWINGS

The invention is described in more detail hereinafter with reference to the figures, the figures merely showing embodiments of the invention and not limiting the general inventive idea.

DETAILED DESCRIPTION

FIGS. 1 to 4 show schematically an inclination adjuster 1. The inclination adjuster 1 preferably consists of a rail 2 and a slide piece 3 guided thereon, which may be locked in various sliding positions on the rail 2, the locking being effected by a claw 6 engaging from the transverse face of the rail 2. The rail 2 is preferably fastened to a motor vehicle seat on the bodywork or to a backrest, whilst the slide piece 3 is preferably arranged on the backrest or on the bodywork. Particularly preferably, the rail 2 in the longitudinal direction of the vehicle is attached in the vicinity of the wheel housing for a rear tire. The slide piece 3 is preferably attached to the backrest of a vehicle back seat.

Figure 1:
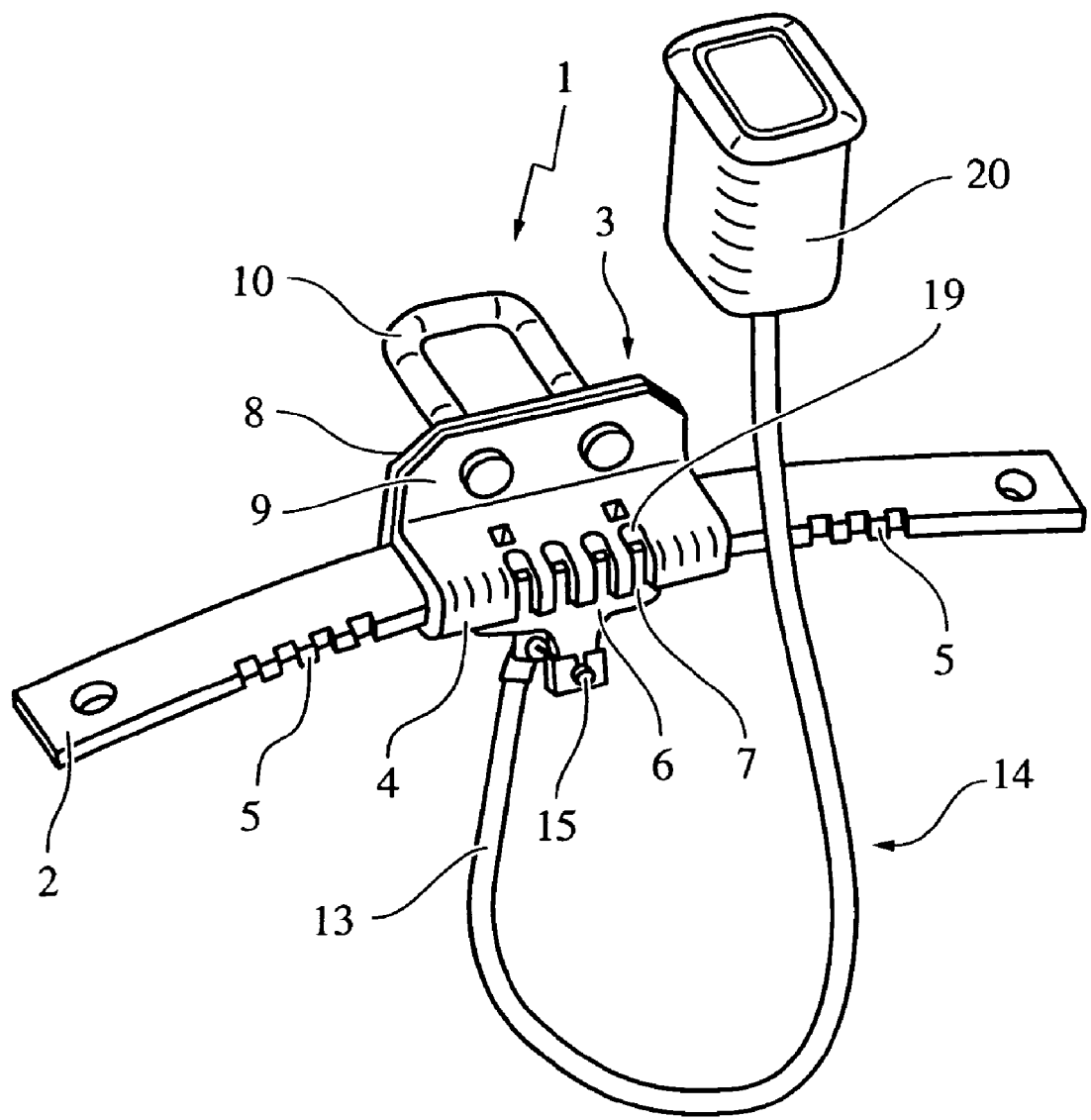
FIG. 1 shows schematically an inclination adjuster with a rail and a slide part.

As shown schematically in FIG. 1, the inclination adjuster 1 comprises the rail 2 and the slide piece 3, the slide piece 3 encompassing the rail 2 with a housing 4. As the slide piece 3, which is preferably fastened to the backrest in the embodiment, moves when pivoting the backrest forward on a circular path about the articulation of the backrest, the rail 2 which is fixed to the bodywork is of curved configuration. The curvature of the rail 2 is preferably arcuate, the surface of the rail 2 which faces in the direction of the tab 16 being preferably compressed in a central region of the rail 2 (region of the slide piece 3 in FIG. 1) and being preferably stretched in an edge region of the rail 2 by the curvature. The rail 2 is preferably fastened to the bodywork in the longitudinal direction of a seat part.

Figure 2:
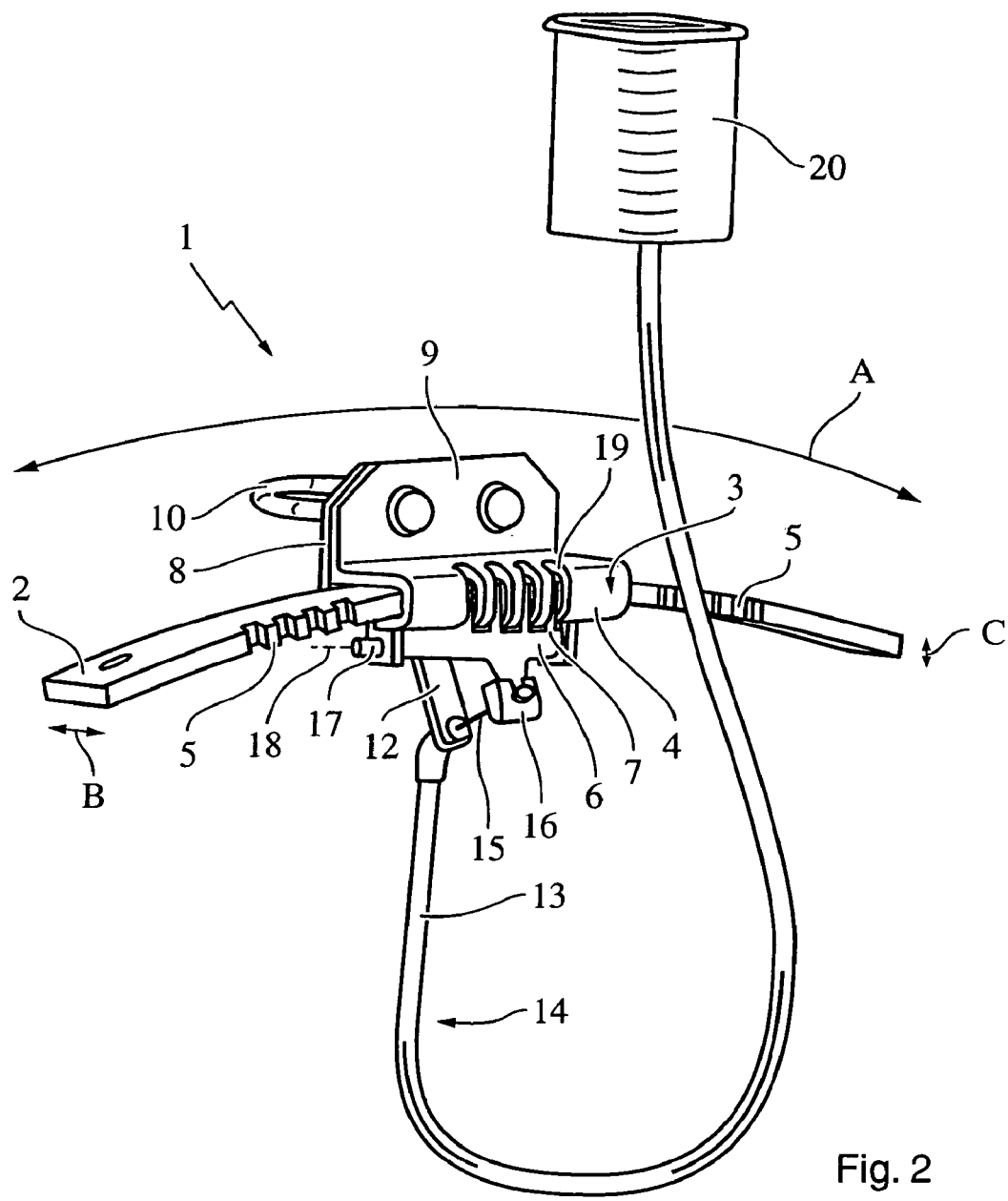
FIG. 2 shows schematically the inclination adjuster, a view being shown of a toothed portion of the rail.

Particularly preferably, the rail 2 consists of a steel strip, which is provided on one of its longitudinal edges with a toothed portion 5 formed by die cutting. The toothed portion 5 is thus also intended to be denoted as latching means 5. In FIG. 2 the rail 2 is shown schematically in side view, in particular the configuration of the rail 2 as a flat profile being intended to be explained using FIG. 2. The length of the rail 2, identified by the arrow A, is intended to be markedly greater, where the rail 2 is a flat profile, than the thickness of the rail identified by the arrow C. The width of the rail 2, identified by the arrow B, is thus dependent on the width of the slide piece 3, as the housing 4 preferably encloses the rail 2.

The slide piece 3 is provided with the claw 6 which comprises a group of teeth 7. The teeth 7 represent in this connection the complementary latching means 7 of the claw 6 and/or of the slide piece 3. This group of teeth 7 may be brought into releasable engagement with the toothed portion 5 of the rail 2, so that the slide piece 3 may be locked relative to the rail 2 in a plurality of positions (three in the embodiment). The claw 6 and/or the slide piece 3 and the rail 2 thus cooperate positively and/or non-positively. Preferably, at least one of the teeth 7 is of wedge-shaped configuration. As a result of the wedge-shaped configuration, the tooth is thus clamped particularly intimately with the toothed portion 5 of the rail 2, so that even small movements are prevented in the direction of the arrow B or in the direction of the arrow C (FIG. 2). Advantageously, therefore, no troublesome rattling noise is produced by the slide piece 3 striking the rail 2, whilst the rail 2 and the slide piece 3 and/or the claw 6 and the rail 2 cooperate positively and/or non-positively. Further preferably, the teeth 7 have a length in the direction of the arrow C (FIG. 2) which is greater than the thickness of the rail 2 in the direction of the arrow C. Particularly preferably, the rail 2 is located substantially in the center of the vertical extension (direction of the arrow C) of the teeth 7, the partial regions of the teeth 7, which are not in contact with the rail 2, preferably being supported on the claw 6.

Figure 3:
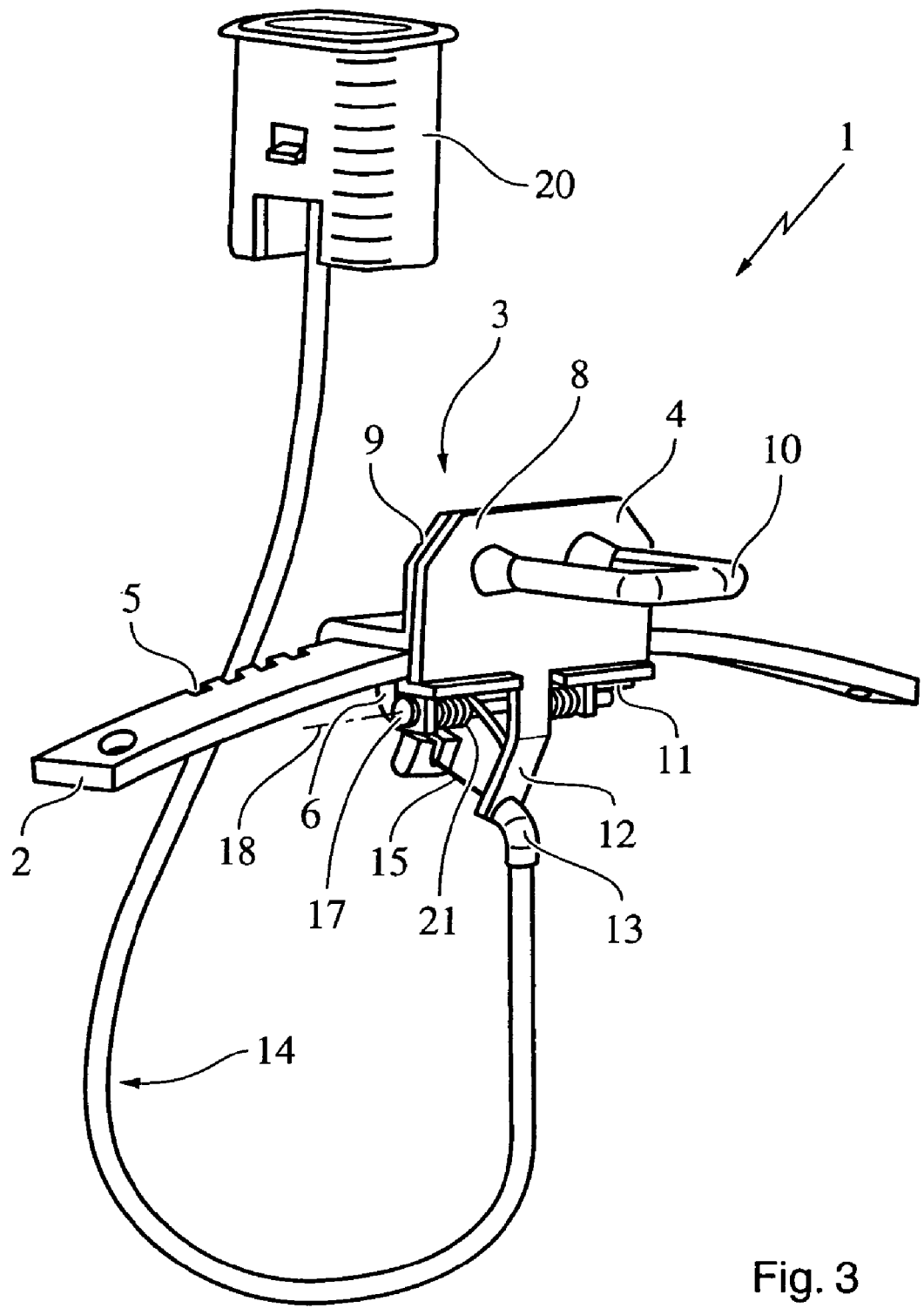
FIG. 3 shows schematically an additional view to FIG. 2 of the inclination adjuster.

From the side view of FIG. 3, it is revealed schematically that the housing 4 of the slide piece 3 is of split construction, segments pressed from sheet steel 8, 9 being connected, preferably being riveted, particularly preferably from behind in the region of a projecting doubled-up metal plate formed from both segments 8, 9, by a riveted-on shackle 10 of a rotary latch lock and by a plug-in connection 11 provided on the housing 4 opposite the shackle 10. The segment 8 further forms an extension 12 protruding beyond the housing 4, on which the sleeve 13 of a Bowden cable 14 is supported. The cores 15 of the Bowden cable 14 are thus preferably connected to a protruding tab 16 of the fork-shaped claw 6 (FIG. 2).

Figure 4:
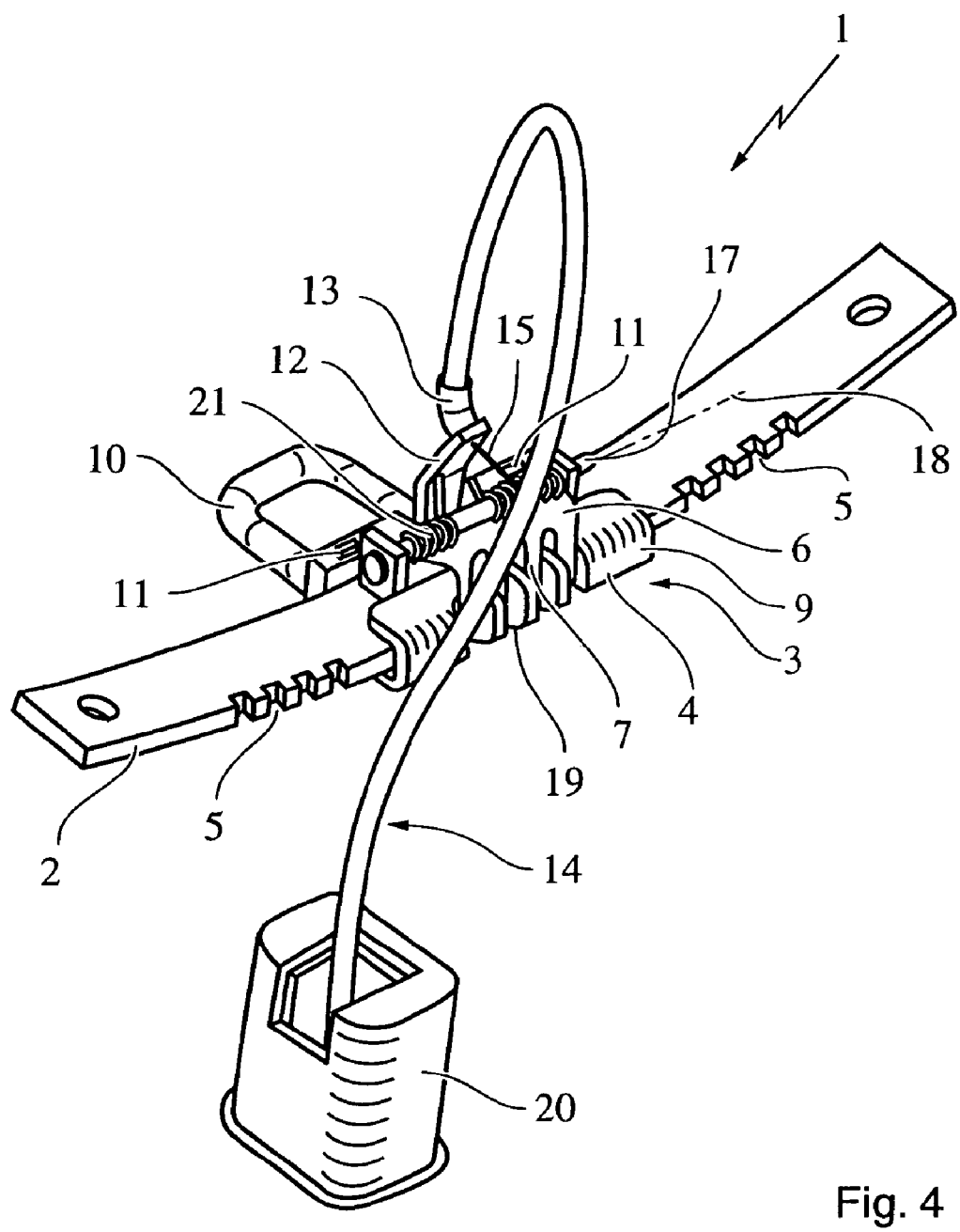
FIG. 4 shows schematically the inclination adjuster in a similar view as in FIG. 2.

In FIG. 4 is shown schematically, amongst other things, that the claw 6 is preferably rotatably mounted about an articulation 17 formed on the housing 4, about the rotational axis 18. The rotational axis 18 thus preferably extends below the rail 2. The claw 6 may preferably be rotated in the direction of the rail 2 and away from the rail 2 about the rotational axis 18. The teeth 7 and the tab 16 are arranged on opposing sides of the rotational axis 18 of the claw 6 extending below the rail 2. The claw 6 is pretensioned by a spring means 21, preferably by a leg spring 21, in the direction of the rail 2. The teeth 7, which engage in the rail 2 through slots 19 in the housing 4, are released from the toothed portion 5 with the pulling of the tab 16 and the resulting rotation of the claw 6 associated therewith, against the action of the leg spring 21 tensioning the claw 6 in the closing direction. If the teeth no longer cooperate positively and/or non-positively with the toothed portion 5 of the rail 2, the slide piece 3 may be displaced along the rail 2 for the inclination adjustment of the backrest.

The regions of the housing 4 forming the articulation 17 are manufactured by parallel cutting of the sheet steel and bending of the region located between the cuts. The articulation 17 is located on the same side of the housing 4 as the extension 12, but opposite the shackle 10.

The actuation of the Bowden cable takes place by a handle 20 which is fastened thereto at the free end of the Bowden cable.

Figure 5:
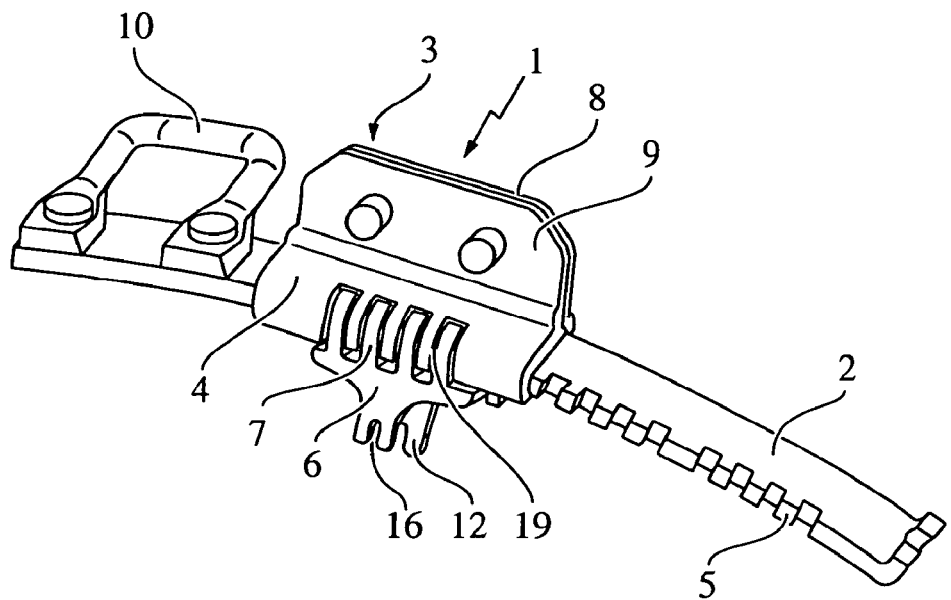
FIGS. 5 and 6 show a further embodiment of the inclination adjuster according to the invention.
Figure 6:
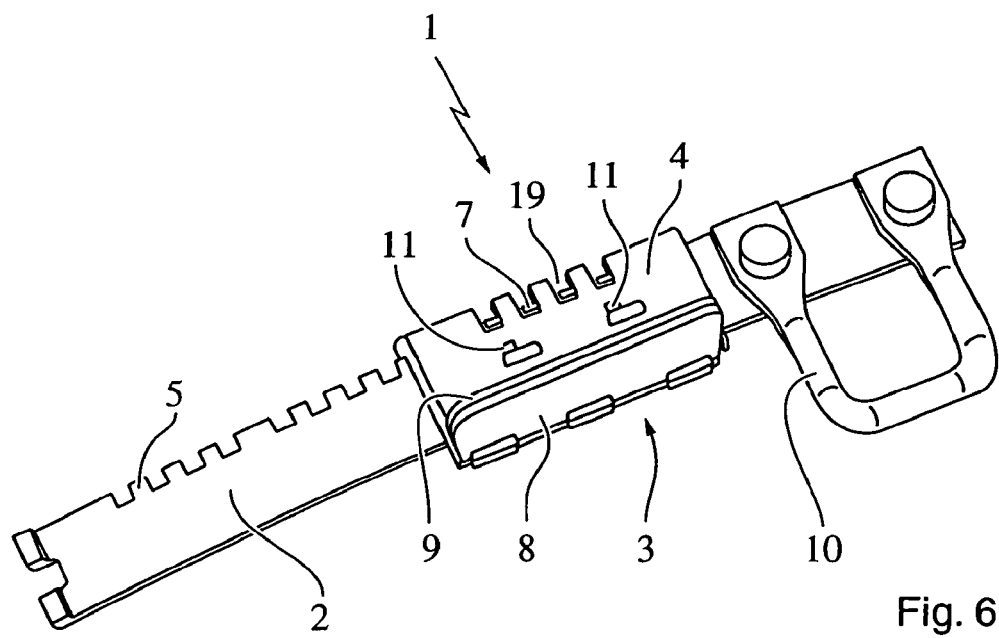

The inclination adjuster 1 according to FIGS. 5 and 6 consists of a slide piece 3, enclosed by a housing 4, in which the rail 2 is displaceably guided. As the rail 2 fastened to the backrest in the embodiment is moved when pivoting the backrest on a circular path about the articulation thereof, the movable rail 2 is of arcuate configuration.

The rail 2 consists of a steel strip, which is provided on one of its longitudinal edges with a toothed portion 5 formed by die cutting. The slide piece 3 is provided with a claw 6 which has a group of teeth 7. This group of teeth 7 may be brought releasably into engagement with in each case one of a plurality of groups of toothed portions 5 of the rail 2, so that the rail 2 may be locked relative to the slide piece 3 in a plurality of positions. The housing 4 of the slide piece 3 is of split construction, the segments 8, 9 pressed from sheet steel being connected in the region of a doubled-up metal plate projecting from both segments 8, 9, by means of two screws serving for fastening to the bodywork as well as a plug-in connection 11 provided opposite on the housing 4.

The segment 8 further forms an extension 12 protruding beyond the housing 4, on which an activating device (for example a Bowden cable) is supported, which when actuated pulls on a protruding tab 16 of the rotatably mounted fork-shaped claw 6. The teeth 7 which engage in the rail 2 through slots 19 in the housing 4 are thus released from the toothed portion 5 with the pulling of the tab 16 and the resulting rotation of the claw 6 associated therewith, against the action of a medium, for example a leg spring, tensioning the claw 6 in the closing direction.

A shackle 10 is riveted onto the rail 2 so that it may be releasably fastened to the backrest 22, in particular by engaging in a rotary latch lock 23 provided in the backrest 22.

Figure 7:
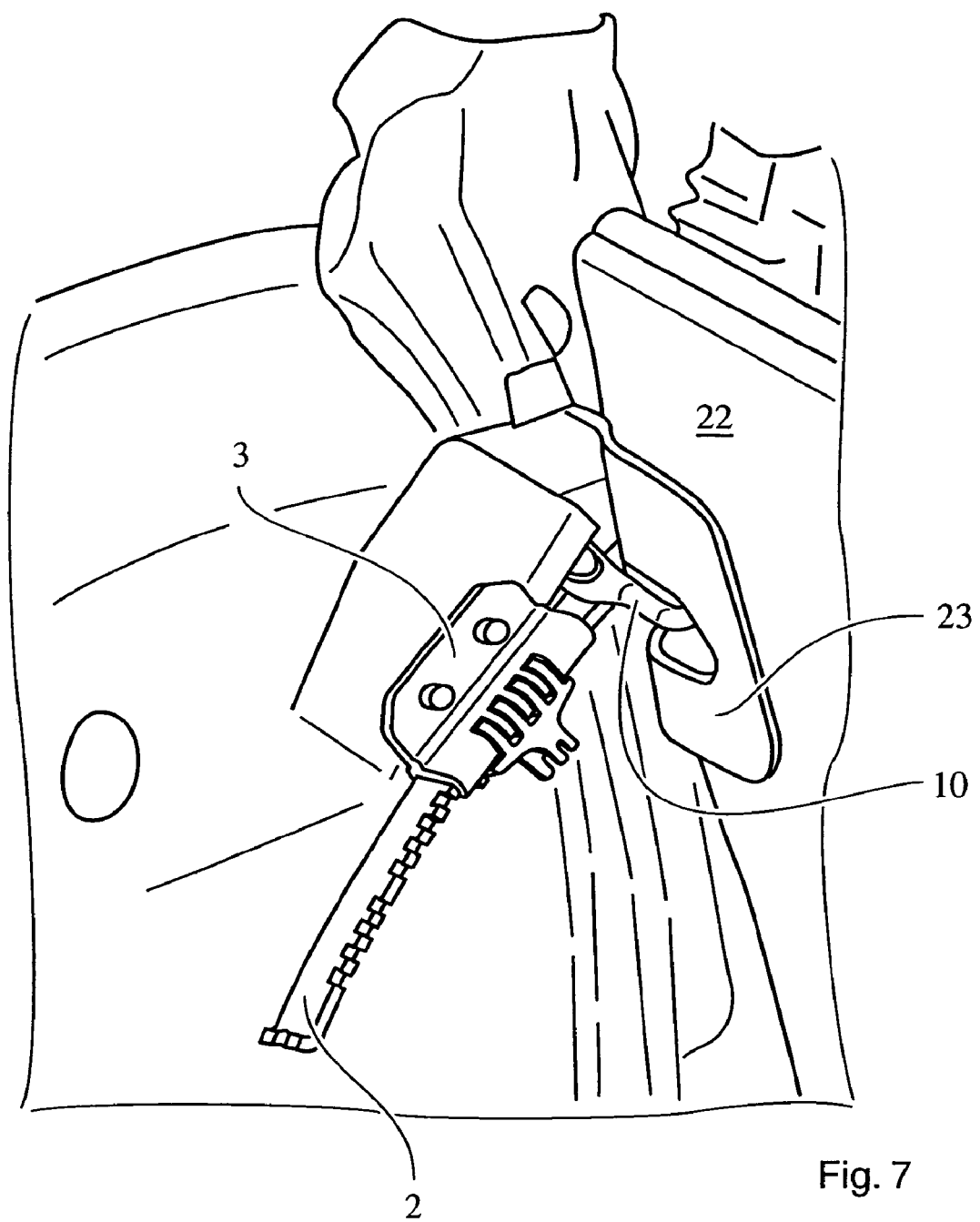
FIG. 7 shows the inclination adjuster according to FIGS. 5 and 6 in the installed state.

The embodiment according to FIGS. 5-7 is accordingly an inclination adjuster, consists of a slide piece and a rail guided therein, which may be locked in various sliding positions in the slide piece, the locking being effected by a claw gripping into the rail from the side. During use, the slide piece is fixed to a motor vehicle seat on the bodywork, whilst the rail is arranged on the backrest.

The invention claimed is:

1. An inclination adjuster for a vehicle seat comprising:
   a one piece curved rail with a flat profile having a first latching portion; and
   a slide piece displaceabley mounted on the rail, the slide piece comprising a claw having a second latching portion for engaging the first latching portion of the rail, wherein an axis of rotation of the claw is generally aligned with a direction of travel of the slide piece, and at least one of the first and second latching portions comprises toothed portions;
   wherein the second latching portion protrudes beyond the rail, and the first and second latching portions cooperate positively, when the second latching portion of the claw is engaged with the first latching portion of the rail.

2. The inclination adjuster as claimed in claim 1, wherein the claw is rotatable about an articulation.

3. The inclination adjuster as claimed in claim 2, wherein actuation of a handle induces the claw to rotate about the articulation.

4. The inclination adjuster as claimed in claim 1, wherein the first latching portion in the rail comprises a plurality of groups of toothed portions arranged at intervals along the rail.

5. The inclination adjuster as claimed in claim 1, wherein the claw is pretensioned by a spring means in the direction of the rail.

6. The inclination adjuster as claimed in claim 1, wherein the rail is provided in a fixed manner.

7. The inclination adjuster as claimed in claim 1, wherein the slide piece is provided in a fixed manner.

8. A backrest of a vehicle back seat comprising an inclination adjuster as claimed in claim 1.

9. The backrest as claimed in claim 8, wherein the rail is configured to be connected to the backrest in a reversible manner.

10. The inclination adjuster as claimed in claim 1, wherein during engagement of the claw in the rail the complementary latching means and the latching means cooperate non-positively.

11. A method for the inclination adjustment of a vehicle seat by means of an inclination adjuster, wherein the inclanation adjuster comprises:
- a one piece curved rail with a flat profile having a first latching portion; and
- a slide piece displaceabley mounted to the rail, the slide piece comprising a claw having a second latching portion for engaging the first latching portion of the rail, wherein an axis of rotation of the claw is generally aligned with a direction of travel of the slide piece, and at least one of the first and second latching portions comprises toothed portions;

wherein the second latching portion protrudes beyond the rail, and the first and second latching portions cooperate positively, when the second latching portion of the claw is engaged with the first latching portion of the rail.

12. The method as claimed in claim 11, wherein for the inclination adjustment the connection is released by actuation of a handle, to rotate the claw away from the rail counter to the force of a spring means and about an articulation.

13. The method as claimed in claim 11, wherein during engagement of the claw in the rail the second latching portion and the first latching portion cooperate non-positively.

* * * * *